May 18, 1937.  J. L. BIRD  2,081,032
MOTOR CONTROL SYSTEM
Filed Dec. 28, 1934
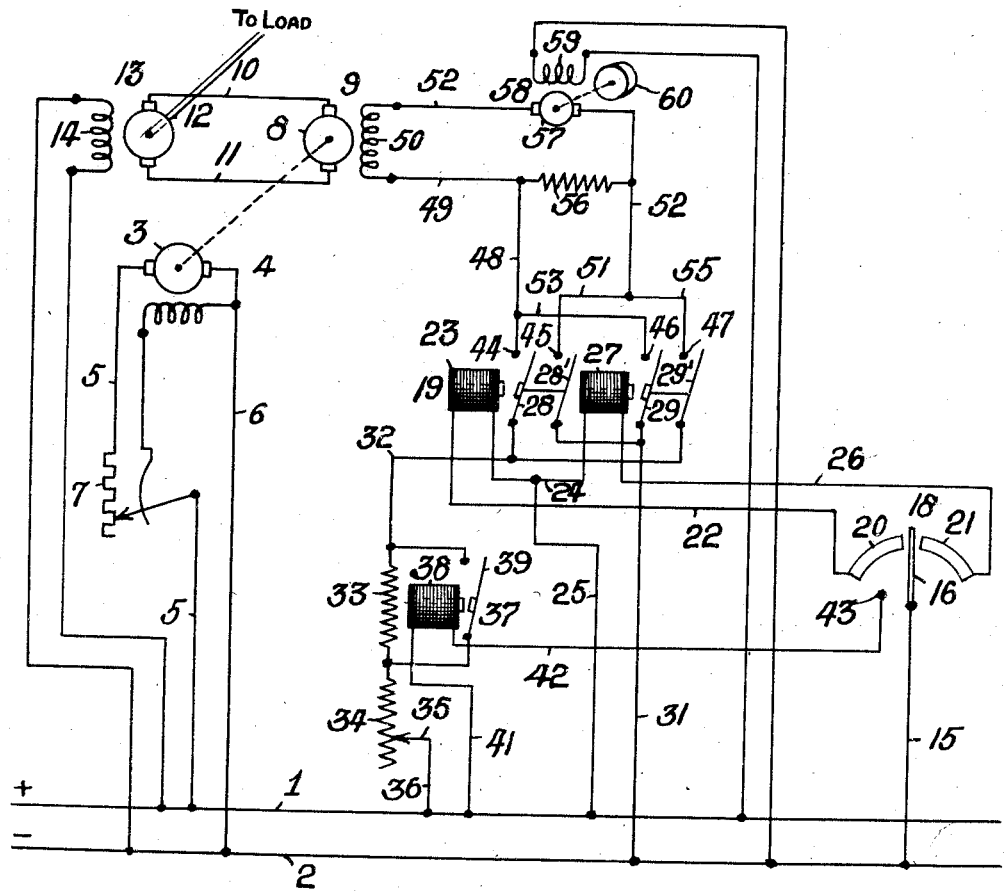
INVENTOR
John L. Bird,
BY Herbert H. Thompson
HIS ATTORNEY.

Patented May 18, 1937

2,081,032

UNITED STATES PATENT OFFICE 2,081,032

MOTOR CONTROL SYSTEM

John L. Bird, Radburn, N. J., assignor to Sperry Gyroscope Company, Inc., Brooklyn, N. Y., a corporation of New York Application December 28, 1934, Serial No. 759,466

5 Claims. (Cl. 172—239)

This invention relates, generally, to motor control systems and the invention has reference, more particularly, to a novel motor control system whereby exceedingly rapid stoppage of the controlled motor is made possible.

In many commercial applications of motors it is essential that the controlled power motor shall stop with great rapidity, i. e., the rate of deceleration of the motor shall be high, and that the connected load be brought to rest in a dead beat manner, without overshooting or oscillation. For example, quick and accurate stoppage is essential for such commercial uses as when operating the steering gear systems of vessels, machine tools such as planes, elevators and conveyers. Therefore, when using the Ward Leonard system of motor control it has been common to employ a magnetic brake on the power motor shaft to effect rapid stoppage of the motor, since the inherent dynamic braking effect of the system is not sufficiently rapid in action to cause a quick stop. This dynamic braking action is dependent upon the rapidity with which the generator field can be reduced to zero and, especially in the case of generators of large capacity, the time constant of the field is usually high so that the dynamic braking is rather slow.

The principal object of the present invention is to provide a novel motor control system of the field control type having means operating on the generator field circuit for causing the rapid stoppage of the power motor, thereby eliminating the use of a magnetic brake in connection with the power motor.

Another object of the present invention lies in the provision of a novel motor control system of the above character wherein a dynamo has its armature connected in the generator field circuit and normally operates as a motor, the said dynamo serving, upon the shutting off of the exciting current to the generator field winding, to temporarily impress upon the generator field circuit a voltage substantially equal and opposite to that which was used to excite the field winding at the instant the exciting supply was broken, thereby instantly reversing the generator field, which in turn reverses the armature voltage supplying the power motor, so that this motor tends to reverse its direction of rotation and hence stops almost immediately.

Still another object of the present invention is to provide a novel motor control system of the above character that is of simple, reliable construction, and which may be economically produced and operated.

Other objects and advantages of this invention will appear as the description proceeds.

In the drawing, the single figure shown is a wiring diagram illustrating a variable motor control system embodying the principles of the present invention.

Referring now to the said drawing, the reference numerals 1 and 2 designate power supply leads to which the armature 3 of a driving motor 4 of a motor-generator set is connected by leads 5 and 6. Lead 5 is shown as having starting resistance 7 included therein. The armature 8 of generator 9 is driven by motor 4 and has its commutator brushes connected by leads 10 and 11 to the brushes of armature 12 of power motor 13, the field winding 14 of which is excited from supply leads 1 and 2.

A lead 15 extends from power lead 2 to the blade 16 of a control switch 18 having contact segments 20 and 21. Segment 20 is connected by a lead 22 to a relay coil 23 of generator field reversing relay 19, which coil in turn is connected by leads 24 and 25 to the other power lead 1. Segment 21 is connected by a lead 26 to a relay coil 27 of relay 19, which coil in turn is connected by leads 24 and 25 to the power lead 1. The energization of coil 23, by moving control switch blade 16 onto segment 20, serves to move normally open reversing relay blades 28 and 28' to closed position, whereas the energization of coil 27, by moving control switch blade 16 onto segment 21, serves to move normally open reversing relay blades 29 and 29' to closed position.

A lead 31 connects power lead 2 with switch blade 29 and a lead 32 connects switch blade 29' through a speed control resistor 33, field rheostat 34, arm 35 and lead 36 to power lead 1. A speed control relay 37, having an operating coil 38 and normally open switch blade 39, serves to short circuit resistor 33 when desired. Coil 38 is connected by lead 41 to power lead 1 and by lead 42 to a stationary contact 43 adapted to be engaged by control switch blade 16.

Field reversing relay blades 28, 28', 29 and 29' are adapted to engage stationary contacts 44, 45, 46 and 47, respectively. Contact 44 is connected by leads 48 and 49 to one side of generator field winding 50, whereas contact 45 is connected by leads 51 and 52 to the other side of field winding 50. Contact 46 is connected by lead 53 to lead 48 and contact 47 is connected by lead 55 to lead 52. A field discharge resistor 56 is connected between leads 48 and 52.

The armature 57 of a dynamo or field reversing generator 58 is connected in lead 52. The dynamo or field reversing generator 58 has its field winding 59 connected across the power leads 1 and 2. The armature 57 of this dynamo is coupled to a load 60 which should have sufficient inertia so that during operation, should the field current passing through armature 57 cease, the momentum of the load 60 will serve to continue the rotation of armature 57 for a desired short period of time.

In operation, when field reversing relay blades 28 and 28' are closed by moving control switch blade 16 onto segment 20, energizing current flows from lead 1, through lead 36, rheostat 34, resistor 33, lead 32, blade 28, lead 48, lead 49, field winding 50, lead 52, armature 57, lead 51, blade 28', and lead 31 to power lead 2. This current energizes generator field winding 50 and, with motor 4 operating, the power motor 13 is caused to operate in one direction. The generator field current also serves to operate dynamo 58 as a motor, thereby driving load 60. In order that the current in the generator field circuit shall be sufficient to produce the required field strength in the generator 9, the load 60 on the dynamo or field reversing generator 58 should be of sufficient magnitude so that with this dynamo or field reversing generator operating as a motor it will draw the required current.

If, now, the control switch blade 16 is thrown to off position, thereby causing the opening of reversing relay blades 28 and 28', the main generator field circuit including armature 57 of the field reversing generator is opened, so that this circuit is no longer supplied with current from the line 1, 2, and the field reversing generator, which up to this instant has been operating as a motor, now becomes a generator and supplies the generator field winding 50 with electrical energy of the opposite polarity to that which was used to excite the same while connected with power leads 1 and 2. The voltage thus developed by dynamo 58 is substantially equal and opposite in direction to that which was used to operate it at the instant the relay blades 28 and 28' opened.

This reversal of the excitation of field winding 50 causes an exceedingly rapid decrease in the generator field flux in the original direction and then a reversal of the field flux so that the armature voltage supplied by the generator to the power motor 13 is reversed. This power motor is now not only decelerated by the dynamic braking action due to the Ward Leonard hook-up, but is further rapidly decelerated since the generator 9 is supplying current to run this power motor in reverse. The resulting action is an exceedingly rapid stoppage of the power motor 13.

By the time the power motor 13 comes to rest, the kinetic energy of the field reversing generator and that of its load has been used up, so that this field reversing generator no longer excites the generator field winding 50. By increasing the inertia of the field reversing generator load, its stored up kinetic energy may be made to produce enough generator action to excite the generator field a longer period of time in the reverse direction, thereby producing even faster stoppage of the power motor, since this motor is now trying to run backwards as well as being decelerated by the inherent dynamic braking action of the armature circuit.

If the control switch blade 16 is swung so as to contact with contact 43 as well as segment 20, the speed control relay 37 operates to cut out resistor 33, thereby causing the speeding up of motor 13. If control switch blade 16 is swung onto segment 21 the generator field winding 50 is excited in the reverse direction, thereby operating motor 13 in the reverse direction. When switch blade 16 is again turned to off position, the field reversing generator 58 operates automatically to reverse the field flux of generator 9, thereby effecting a rapid stoppage of power motor 13.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a motor control system, a power motor, a generator for supplying electrical operating energy to said power motor, said generator having a field winding, a source of current supply for said field winding, and a closed circuit for said field winding, said circuit including an auxiliary dynamo arranged for connection to said source of current supply in series with said field winding, said dynamo operating as a motor during the normal excitation of said generator, and operating, upon the cessation of such excitation, as a generator, whereby, by tending to cause the reversal of the residual generator excitation, a quick falling off of generator flux and rapid stoppage of said power motor is effected.

2. In a motor control system, a power motor, a generator for supplying electrical operating energy to said power motor, means for driving said generator, said generator having a shunt type field winding and means for supplying current to said field winding, a dynamo connected in the circuit of said field winding for normally operating as a motor, said dynamo and said field winding being connected in series across said current supply means, an impedance connected across said source of supply and arranged in series with said field winding and said auxiliary dynamo, a load driven by said dynamo, the momentum of said dynamo and its load serving, upon the shutting off of the supply of current to said field winding, to temporarily continue the rotation of said dynamo, whereby the latter operates as a generator for causing the rapid falling off of the generator field flux, and effects quick stoppage of said power motor.

3. In a motor control system, a power motor, a generator for supplying electrical operating energy to said power motor, said generator having a field winding, a source of current supply for said field winding, and a dynamo having its rotor connected across said source of current supply in series with said field winding, a resistor connected across said source of supply and arranged in series with said field winding and said auxiliary dynamo rotor, a load for said rotor, said rotor and its load having a predetermined inertia, said dynamo normally operating as a motor to drive said load during the normal excitation of said generator, and serving, upon the cessation of such normal excitation, owing to the momentum of said rotor and its load, to function as a generator to supply said field winding through said resistor with electrical energy of the opposite polarity to that which was used to excite the same, whereby rapid reversing of the generator flux and quick stoppage of the power motor are effected.

4. In a motor control system, a power motor, a generator for supplying electrical operating energy to said power motor, said generator having a separately excited field winding, a source of current supply for said field winding, a circuit for said field winding, a field discharge resistance in said circuit, and a dynamo having its rotor connected in said circuit in series with said field winding and said discharge resistance, said dynamo being arranged for connection in series with said field winding across said current supply source for functioning as a motor during the normal excitation of said generator, and serving, upon the cessation of such excitation, to operate as a generator to reverse the field flux of said generator field winding, thereby effecting a rapid stoppage of said power motor.

5. In a motor control system, a power motor, a generator for supplying electrical operating energy to said power motor, said generator having a single field winding of the shunt type, a source of current supply for said field winding, a closed circuit for said field winding, and an auxiliary dynamo having its rotor included in said circuit, said field winding and said rotor being arranged to be connected in series across said current supply source, said dynamo functioning as a motor during the normal excitation of said generator, and serving, upon the cessation of such excitation, to operate as a generator to reverse the field flux of said generator field winding, thereby effecting a rapid stoppage of said power motor.

JOHN L. BIRD.